(12) United States Patent
Pinto

(10) Patent No.: US 7,111,850 B2
(45) Date of Patent: Sep. 26, 2006

(54) WHEELED VEHICLE PROVIDED WITH AN OSCILLATING AXLE AND A PAIR OF CYLINDERS FOR BLOCKING THE AXLE

(75) Inventor: Massimo Pinto, Chieri (IT)

(73) Assignee: CNH America LLC, New Holland, PA (US)

( * ) Notice: Subject to any disclaimer, the term of this patent is extended or adjusted under 35 U.S.C. 154(b) by 363 days.

(21) Appl. No.: 10/730,245

(22) Filed: Dec. 8, 2003

(65) Prior Publication Data

US 2004/0145127 A1 Jul. 29, 2004

(30) Foreign Application Priority Data

Dec. 6, 2002 (IT) .................. TO2002A1067

(51) Int. Cl.
*B60S 9/00* (2006.01)
(52) U.S. Cl. ................ 280/6.154; 280/754; 403/408.1
(58) Field of Classification Search ............ 280/6.154, 280/754, 755; 248/56; 403/408.1, 365; 411/546
See application file for complete search history.

(56) References Cited

U.S. PATENT DOCUMENTS

| | | | | | |
|---|---|---|---|---|---|
| 2,473,338 | A | * | 6/1949 | Kilmer ..................... | 280/754 |
| 2,561,121 | A | * | 7/1951 | Johnson et al. ............ | 248/56 |
| 3,011,743 | A | * | 12/1961 | Heath ...................... | 248/27.1 |
| 4,152,000 | A | * | 5/1979 | Meisel, Jr. ................ | 280/677 |
| 4,264,014 | A | * | 4/1981 | Hogg et al. ................ | 212/276 |
| 4,630,415 | A | * | 12/1986 | Attwell .................... | 52/321 |
| 5,639,119 | A | * | 6/1997 | Plate et al. ............... | 280/754 |
| 5,813,697 | A | * | 9/1998 | Bargenquast et al. ....... | 280/754 |
| 5,888,012 | A | * | 3/1999 | Nygren et al. .............. | 403/13 |
| 5,967,536 | A | * | 10/1999 | Spivey et al. ........ | 280/124.141 |
| 6,068,344 | A | * | 5/2000 | Nether ................... | 301/35.632 |
| 6,092,819 | A | * | 7/2000 | Overby et al. ........ | 280/124.153 |
| 6,126,178 | A | * | 10/2000 | Chino .................... | 280/6.154 |
| 6,131,918 | A | * | 10/2000 | Chino .................... | 280/6.154 |
| 6,176,501 | B1 | * | 1/2001 | Bartolone .............. | 280/86.756 |
| 6,659,702 | B1 | * | 12/2003 | Kitayama et al. ........... | 411/546 |
| 6,857,691 | B1 | * | 2/2005 | Kuroda et al. ......... | 296/203.02 |
| 6,899,488 | B1 | * | 5/2005 | Geringer et al. ............ | 403/337 |
| 2001/0040359 | A1 | * | 11/2001 | Hildebrand ................ | 280/686 |
| 2002/0014754 | A1 | * | 2/2002 | Konop ..................... | 280/86.5 |
| 2003/0235465 | A1 | * | 12/2003 | Geringer et al. ......... | 403/408.1 |
| 2004/0056465 | A1 | * | 3/2004 | Lagsdin ................... | 280/763.1 |
| 2004/0154844 | A1 | * | 8/2004 | Lovato ........................ | 180/41 |
| 2005/0053419 | A1 | * | 3/2005 | McMillan et al. ............. | 403/2 |
| 2005/0073141 | A1 | * | 4/2005 | Baird et al. .............. | 280/766.1 |

* cited by examiner

*Primary Examiner*—Paul N. Dickson
*Assistant Examiner*—Barry Gooden, Jr.
(74) *Attorney, Agent, or Firm*—Stephen A. Bucchianeri; John William Stader; Michael G. Harms

(57) ABSTRACT

A wheeled vehicle including a chassis; an axle coupled to the chassis to oscillate about a longitudinal axis parallel to a direction of advance of the vehicle; a pair of cylinders disposed between the axle and the chassis for blocking oscillation of the axle; and a fixing assembly for fixing the cylinders to the chassis, the fixing assembly comprising a plate, a plurality of connection screws extending through the plate, at least one annular rest portion affixed in cantilever fashion to one of the chassis and the plate, the annular rest portion surrounding a corresponding one of the plurality of connection screws and defining a shoulder that supports the plate in a radial direction with respect to the axis of the connection screw.

6 Claims, 3 Drawing Sheets

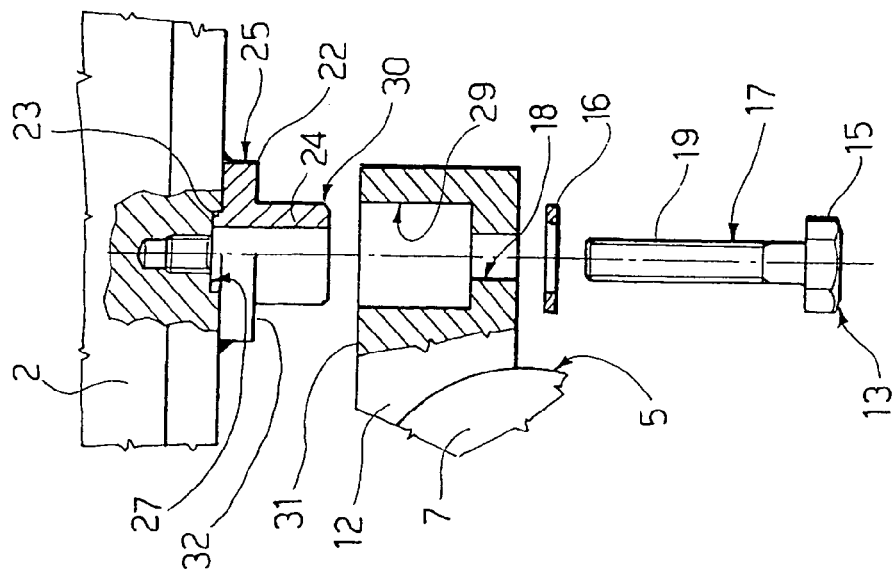
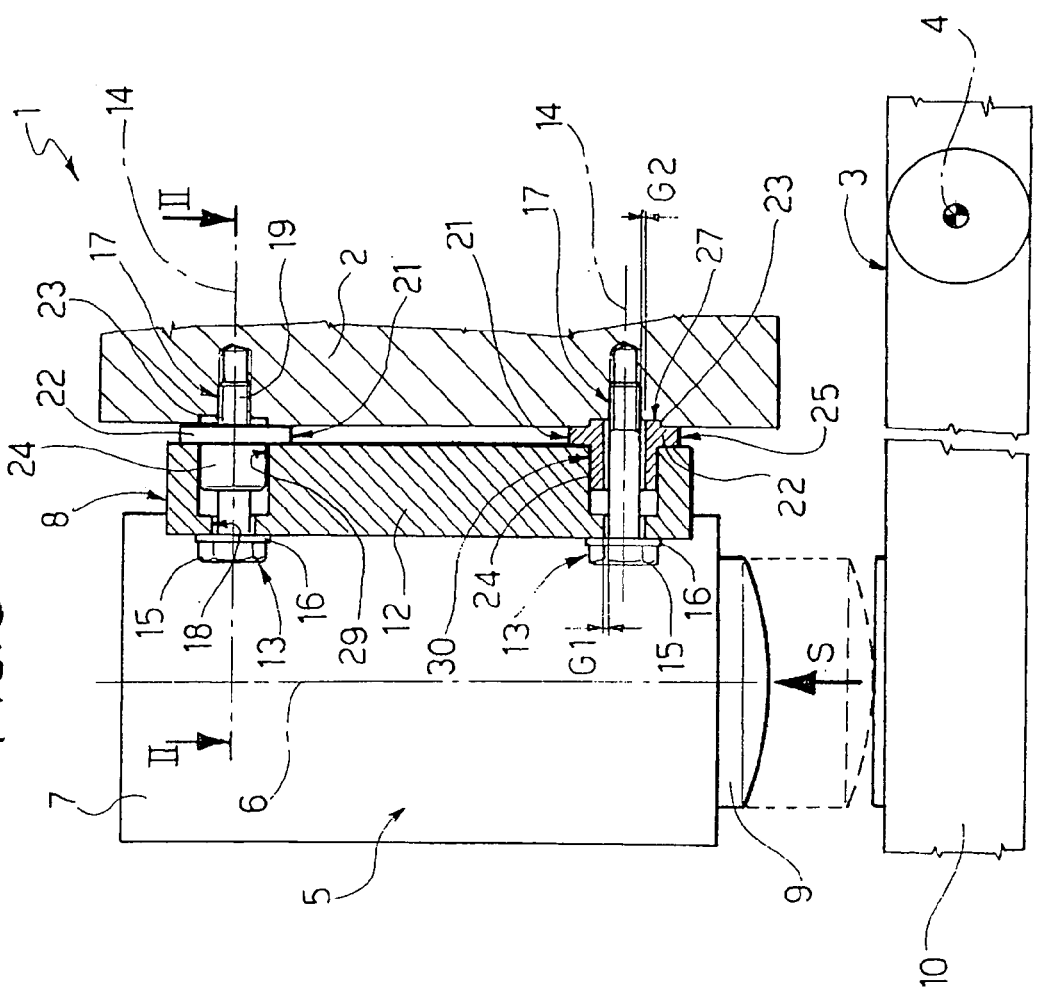

WHEELED VEHICLE PROVIDED WITH AN OSCILLATING AXLE AND A PAIR OF CYLINDERS FOR BLOCKING THE AXLE

BACKGROUND OF THE INVENTION

1. Field of the Invention

The present invention relates to a wheeled vehicle, in particular to an earth-moving vehicle or an excavating vehicle, which is provided with a chassis, an axle that oscillates with respect to the chassis about a longitudinal axis, and a pair of hydraulic cylinders controlled for blocking oscillation of the axle in some operating conditions of the vehicle.

2. Description of the Background of the Invention

In known vehicles of the type just described, the two cylinders are coupled to the chassis on side parts set opposite to one another with respect to the longitudinal axis, extend in a direction transverse to the axle, and comprise respective liners, each of which is connected to the chassis by means of a corresponding fixing device.

This fixing device comprises a plate welded to the liner of the cylinder and set resting on a side surface of the chassis and a plurality of screws, each of which extends through the plate and is screwed into the chassis.

In use, the axle exerts on the cylinders a vertical thrust load that is transferred from the plate to the chassis. In optimal conditions, the pull with which the screws are screwed is such that the thrust load is transferred onto the chassis exclusively through the friction present between the side surfaces of the plate and the chassis, which are coupled together by resting against one another, without exerting shear stress on the screws.

When instead the pull with which the screws are screwed slackens off with passage of time and use of the vehicle, the plate tends to transfer the aforesaid thrust load, no longer directly onto the chassis, but onto the side surface of the screws, thus subjecting the screws themselves to shear stresses, which reduce the life of the screws.

The purpose of the preferred embodiment is to provide a wheeled vehicle equipped with a chassis, an axle that oscillates with respect to the chassis, and a pair of cylinders for blocking the axle, which will enable the problem set forth above to be solved in a simple and economically advantageous way.

According to the present invention, a wheeled vehicle includes a chassis; an axle coupled to the chassis to oscillate about a longitudinal axis parallel to a direction of advance of the vehicle; a pair of cylinders disposed between the axle and the chassis for blocking oscillation of the axle; and a fixing assembly for fixing the cylinders to the chassis, the fixing assembly comprising a plate, a plurality of connection screws extending through the plate, at least one annular rest portion affixed in cantilever fashion to one of the chassis and the plate, the annular rest portion surrounding a corresponding one of the plurality of connection screws and defining a shoulder that supports the plate in a radial direction with respect to the axis of the connection screw.

Preferably, the annular rest portion defines a cylindrical shoulder, which is coaxial to the connection screw, forms part of a bushing fixedly connected to the chassis, and engages a cylindrical seat made in the plate and having a diameter rounding off upwards that of the cylindrical shoulder.

BRIEF DESCRIPTION OF THE DRAWINGS

FIG. 3 is a partial, cross-sectional front view of an axle that oscillates with respect to its own chassis for use in a wheeled vehicle including a pair of cylinders for blocking the axle, according to a preferred embodiment of the present invention; and FIG. 4 is an exploded view of some details of FIG. 3, partially sectioned according to the line II—II of FIG. 3 itself.

DETAILED DESCRIPTION OF THE PREFERRED EMBODIMENTS

Figure 1:
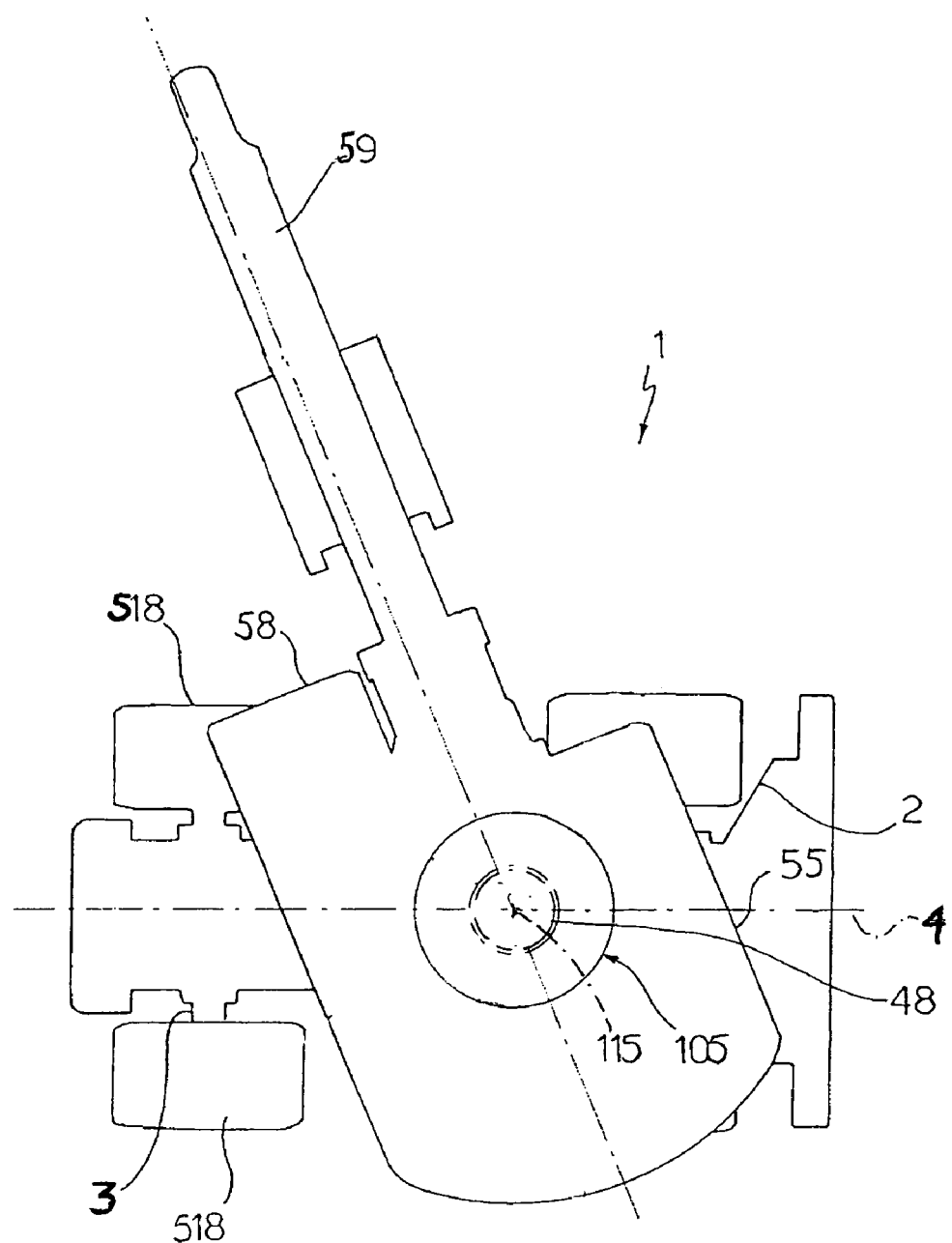
FIG. 1 is a schematic plan view of a preferred embodiment of the wheeled vehicle equipped with an oscillating axle, according to a preferred embodiment of the present invention.
Figure 2:
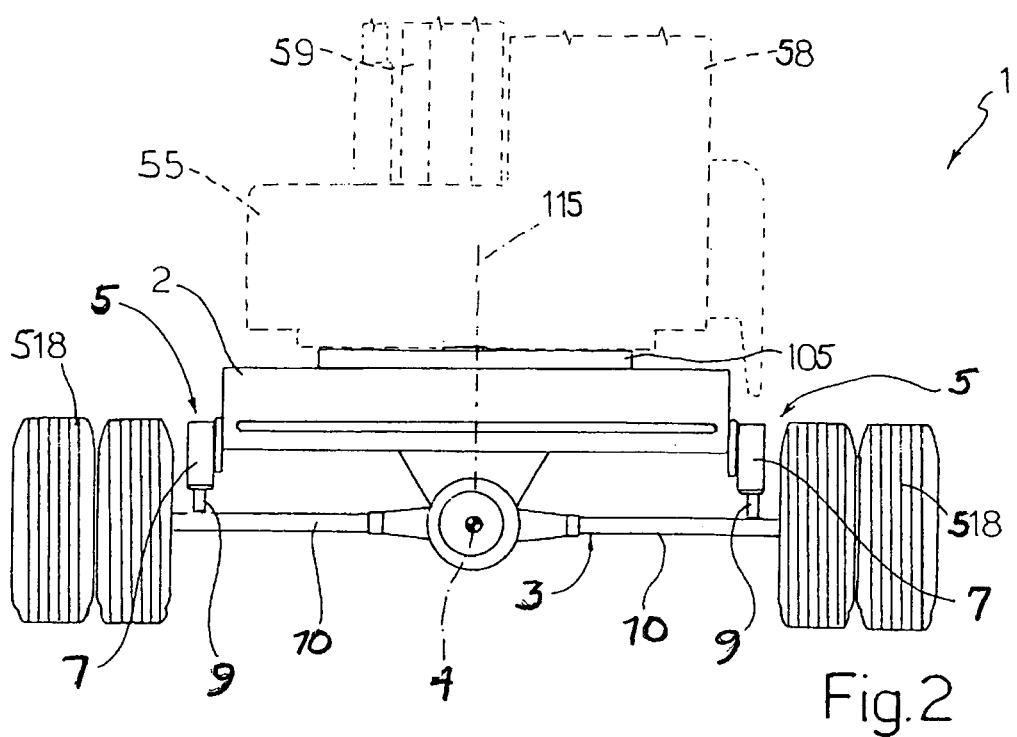
FIG. 2 is a schematic and partial front view of the vehicle of FIG. 1.

In FIGS. 1 and 2, the reference number 1 designates an earth-moving wheeled vehicle comprising a bottom chassis 2 and a top chassis 55, which is equipped with a driving cab 58 and an operating arm 59 of a known type, for example an excavating arm, which extends in cantilever fashion from the chassis 55.

The chassis 2, 55 are coupled together by means of a rotating thrust-bearing device 105 (illustrated schematically and partially in FIG. 2), which enables a relative rotation of the bottom and top chassis 2, 55 themselves about a vertical axis 115.

With reference to FIG. 2, the vehicle 1 further comprises a front axle 3, which carries the front wheels 518 and is coupled to the chassis 2 (in a known way and not described in detail herein) to enable oscillation about a longitudinal axis 4 parallel to a direction of advance of the vehicle 1 and hence to enable the vehicle 1 to adapt to the irregularities of the terrain during the vehicle's advance.

Oscillation of the axle 3 can be blocked by means of two hydraulic cylinders 5 of a known type, which extend in a direction transverse to the axle 3 itself and each of which comprises a corresponding liner 7 fixed to the chassis 2 and a corresponding rod 9, which can slide with respect to the liner 7 and is set resting, at its end, against a corresponding axle shaft 10 of the axle 3. The cylinders 5 define respective rear chambers (not illustrated), which communicate with one another through a pipe and which contain oil, the flow of which from one cylinder 5 to the other through the pipe is controlled by a hydraulic control unit of a known type.

In FIG. 3, the front axle 3 (partially and schematically illustrated) is coupled to the chassis 2 in a known way (not illustrated) to enable oscillation about a median longitudinal axis 4, orthogonal to the plane of FIG. 3 and parallel to a direction of advance of the vehicle 1. The oscillation of the axle 3 with respect to the chassis 2 enables the vehicle 1 to adapt to the irregularities of the terrain during vehicle advance and can be blocked by means of two hydraulic cylinders 5, of which only one is illustrated in FIG. 3. The cylinders 5 are set on opposite side parts of the chassis 2, extend along respective vertical axes 6 transverse to the axle 3, and each cylinder comprises a corresponding liner 7, fixed to the chassis 2 by means of a fixing device 8, and a corresponding rod 9, which can slide axially with respect to the liner 7 between a retracted position and an extended position (illustrated by a dashed line).

Each rod 9 is set resting against a corresponding axle shaft 10 of the axle 3 and in use receives from this axle shaft 10 an axial thrust S, which is directed upwards and, in use, is transferred, first from the rod 9 to the liner 7, and then from the latter to the chassis 2 through the device 8.

According to what is illustrated in the attached figures, the device 8 comprises a plate 12, which is fixedly connected to the liner 7 by means of welding and by a plurality of screws 13 (just two of which are illustrated in FIG. 1), which extend along respective axes 14 orthogonal to the axes 4 and 6.

Each screw 13 comprises a corresponding head 15 axially coupled to the plate 12 by interposition of a washer 16, and a corresponding shaft 17, which extends through the washer 16, engages with radial play G1 a corresponding through hole 18 of the plate 12, and terminates with a threaded stretch 19, which is screwed into the chassis 2.

With particular reference to FIG. 2, the device 8 further comprises, for each screw 13, a corresponding bushing 21, which is coaxial to the screw 13, is fitted about the screw 13 itself with radial play G2, and comprises an external radial projection 22.

The projection 22 is set resting axially, on one side, against the chassis 2 and, on the other, against the plate 12, and is delimited radially by an external cylindrical surface 25 welded to the chassis 2.

The bushing 21 further comprises two terminal portions 23, 24 which extend in cantilever fashion from opposite axial parts of the projection 22. The portion 23 defines a centering appendage, which engages a corresponding centering seat 27 made in the chassis 2 substantially without radial play, while the portion 24 engages a corresponding cylindrical seat 29, defined by a terminal stretch of the hole 18, and has a diameter that rounds off downwards that of the seat 29 itself, in such a way as to define a shoulder 30 or external cylindrical surface designed to support the plate 12 in a radial direction with respect to the axis 14 in the absence of a sufficient pull of the screw 13.

In use, when the vehicle 1 is new, the pull of each screw 13 is such as to transfer the thrust S from the plate 12 to the chassis 2 through the contact and friction present between a surface 31 axially delimiting the plate 12 and a surface 32 axially delimiting the projection 22 (see FIG. 2) and by means of the welding seam between the projection 22 and the chassis 2. Consequently, in this optimal operating condition, the plate 12 does not exert shearing forces 12, either on the bushings 21 on account of the corresponding sizing of the diameters of the shoulder 30 and of the seat 29, or on the screws 13 thanks to the presence of the play G1 and G2.

With the passage of time and with use of the vehicle 1, the pull of the screws 13 can slacken off, in which case the internal surfaces of the seats 29 come to rest on the respective shoulders 30 of the bushings 21, which start to support the plate 12 in a radial direction with respect to the axes 14.

In this operating condition, the thrust S is transferred from the plate 12 to the chassis 2 owing to a shear stress, which, however, is not exerted on the screws 13, but on the bushings 21 thanks to the coupling between the portions 24 and the seats 29. The bushings 21 have a diameter much greater than that of the screws 13, so that they have a resistance to shear stresses that is in general much greater than that of normal screws. The screws 13 continue not to be shear stressed once again on account of the presence of the play G1 and G2.

Finally, from the foregoing it emerges clearly that in the vehicle 1 described, the presence of the portions 24 between the plate 12 and the screws 13 provides a reliable device 8 with a relatively long life, in so far as it prevents shear stresses on the screws 13.

The fact that the portions 24 surround the screws 13 coaxially to the screws 13 themselves enables the screws 13 to support shear stresses in any radial direction with respect to the axes 14, and not only unidirectional shear stresses directed from below upwards.

The presence and the conformation of the bushings 21 enable installation of the device 8 in a simple way and appropriate sizing of the diameter of the portions 24 themselves. In particular, the projection 22 enables convenient welding of the bushings 21 to the chassis 2.

Finally, from the foregoing it emerges clearly that modifications and variations can be made to the device 8 described herein with reference to the attached figures, without thereby departing from the scope of protection of the present invention.

In particular, the portions 24 could be other than cylindrical and/or could be integral with one between the chassis 2 and the plate 12.

The invention claimed is:

1. A wheeled vehicle comprising:
   a chassis;
   an axle coupled to said chassis to oscillate about a longitudinal axis parallel to a direction of advance of the vehicle;
   a pair of cylinders disposed between said axle and said chassis for blocking oscillation of said axle; and
   a fixing assembly for fixing the cylinders to said chassis, said fixing assembly comprising a plate, a plurality of connection screws extending through said plate, at least one annular rest portion affixed in cantilever fashion to one of said chassis and said plate and constrained from movement in both a radial and axial direction relative to one of said screws by said plate and said chassis, said annular rest portion surrounding a corresponding one of said plurality of connection screws and defining a shoulder that supports said plate in a radial direction with respect to the axis of the connection screw.

2. The vehicle according to claim 1, wherein said annular rest portion defines a cylindrical shoulder coaxial to said connection screw.

3. The vehicle according to claim 2, wherein said annular rest portion forms part of a bushing fixed to said chassis and engages a cylindrical seat made in said plate.

4. The vehicle according to claim 1, wherein said fixing assembly comprises a corresponding annular rest portion for each of said connection screws; there being radial play between said connection screws and the respective annular rest portions, and between said connection screws and said plate.

5. A wheeled vehicle comprising:
   a chassis;
   an axle coupled to said chassis to oscillate about a longitudinal axis parallel to a direction of advance of the vehicle;
   a pair of cylinders disposed between said axle and said chassis for blocking oscillation of said axle; and
   a fixing assembly for fixing the cylinders to said chassis, said fixing assembly comprising a plate, a plurality of connection screws extending through said plate, at least one annular rest portion affixed in cantilever fashion to one of said chassis and said plate, said annular rest portion surrounding a corresponding one of said plurality of connection screws and defining a shoulder that supports said plate in a radial direction with respect to the axis of the connection screw;
   wherein said annular rest portion defines a cylindrical shoulder coaxial to said connection screw and forms part of a bushing fixed to said chassis and engages a cylindrical seat made in said plate; and
   further wherein said bushing comprises an external annular projection set axially between said chassis and said plate and welded to said chassis.

6. The vehicle according to claim 5, wherein said bushing further comprises a centering portion set opposite to said annular rest portion and engaging a corresponding centering seat, which is formed in said chassis.

* * * * *